(No Model.)
W. R. DOWNING.
Grubbers.
No. 227,620.  Patented May 18, 1880.
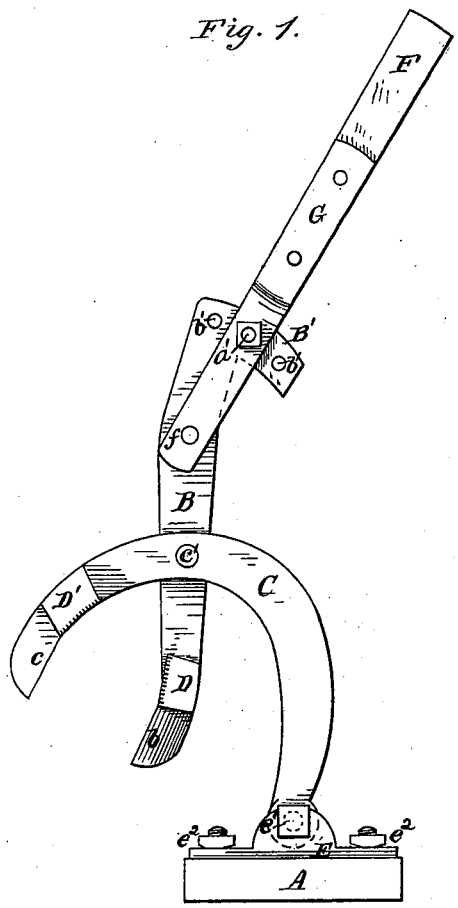
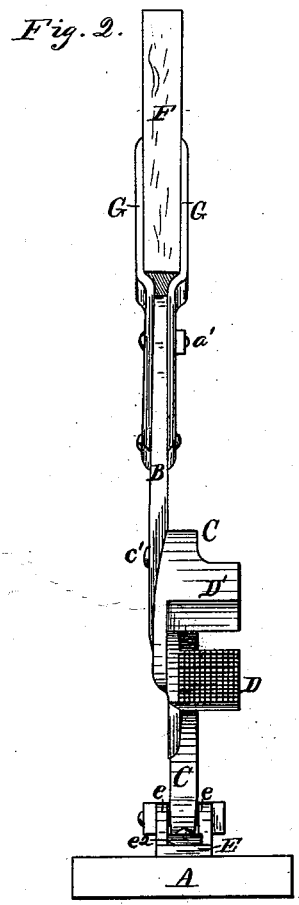
WITNESSES:
H. N. Low.
D. P. Cowl
INVENTOR:
William R. Downing
by H. H. Doubleday
atty

UNITED STATES PATENT OFFICE.

WILLIAM R. DOWNING, OF MURFREESBOROUGH, TENNESSEE.

GRUBBER.

SPECIFICATION forming part of Letters Patent No. 227,620, dated May 18, 1880.

Application filed March 11, 1880. (No model.)

*To all whom it may concern:*

Be it known that I, WILLIAM R. DOWNING, of Murfreesborough, in the county of Rutherford and State of Tennessee, have invented certain new and useful Improvements in Grubbers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation of the improved grubber when open. Fig. 2 is a front view.

In the drawings, A represents a bed-plate, upon which is mounted the grubber, which is constructed as follows:

B is a lever, carrying at its lower end a shear-knife, as shown at $b$.

C is a peculiarly-curved lever, pivoted to the part B at $c'$, it being also provided with a knife-edge, $c$, corresponding to the one at $b$, the two being arranged to sever roots, stalks, &c., with great advantage.

D D' are griping-jaws attached, respectively, to the levers B and C, and in corresponding positions, being adapted to grasp the stalk and withdraw it after the severance of the root.

The curved lever C is not secured rigidly to the bed-plate A, but is hinged to it in such manner that the operator can easily move the operative parts of the device into any desired position without straining or moving the supporting parts.

E represents the block or box whereby the lever is hinged to the bed-piece A. It is formed with ears $e$ $e$, between which the lever is hinged, as at $e'$, and it is firmly bolted to the piece A, as shown at $e^2$ $e^2$.

F represents the handle by which the device is manipulated. It is attached to the lever B adjustably, in order to permit the operator to use the shears and the griping-jaws at all points with equal advantage.

The lever B is provided with a laterally-projecting arm, B', in which there are several perforations, $b'$ $b'$, situated substantially radially relative to the point $f$. The handle F is secured by a pivot at the point $f$, and by a removable pin, $a'$, inserted through the handle and through the perforated arm $b'$. I prefer to provide the handles with two metal straps, G G, arranged one upon each side of the lever B B', as shown.

What I claim is—

The combination, with the lever C, hinged to the bed-plate, and provided with a cutting-edge, $c$, and a griping-jaw, D', of the lever B, having the cutting-edge $b$ and the griping-jaws D, substantially as set forth.

In testimony that I claim the foregoing I have hereunto set my hand this 21st day of February, 1880.

WILLIAM R. DOWNING.

Witnesses:
FRANK WHITE,
A. JAMES PARIS.